United States Patent [19]

Michalko

[11] 4,337,712
[45] Jul. 6, 1982

[54] INJECTION PLOW

[75] Inventor: Jan Michalko, Bratislava, Czechoslovakia

[73] Assignee: Jednotne reolnicke druzstvo, Modra, Czechoslovakia

[21] Appl. No.: 175,876

[22] Filed: Aug. 6, 1980

Related U.S. Application Data

[63] Continuation-in-part of Ser. No. 929,953, Aug. 1, 1978, abandoned.

[30] Foreign Application Priority Data

Aug. 1, 1977 [CS] Czechoslovakia ............ 5062-77

[51] Int. Cl.³ .............................................. A01C 23/02
[52] U.S. Cl. .......................................... 111/7; 111/86; 172/176
[58] Field of Search ............. 111/1, 6, 7, 34, 74, 111/77, 86; 172/176, 739; 222/621; 239/147

[56] References Cited

U.S. PATENT DOCUMENTS

| | | | |
|---|---|---|---|
| 544,930 | 8/1895 | Provine | 239/147 |
| 581,416 | 4/1897 | Dunn et al. | 222/621 |
| 890,268 | 6/1908 | Erickson | 172/176 |
| 3,967,564 | 7/1976 | Emling | 111/7 |

FOREIGN PATENT DOCUMENTS

| | | | |
|---|---|---|---|
| 651204 | 9/1937 | Fed. Rep. of Germany | 111/6 |
| 63911 | 9/1968 | German Democratic Rep. | 172/739 |
| 843895 | 7/1939 | France | 111/7 |
| 1386236 | 12/1964 | France | 111/6 |
| 482142 | 12/1975 | U.S.S.R. | 111/7 |
| 586863 | 1/1978 | U.S.S.R. | 111/7 |

Primary Examiner—James R. Feyrer

[57] ABSTRACT

A fertilizer injection plow for underground fertilization by paste or liquid fertilizer. The plow, which is adapted for being mounted on a vehicle such as a tractor, carries one or more plowshares which are adjustable as to their depth of penetration into the soil. A fertilizer-containing drum is mounted on the plow for rotation by ground engagement as the plow travels. A fertilizer injection pump, driven by rotation of the drum, forces fertilizer to one or more nozzles disposed rearwardly of the plowshares.

5 Claims, 3 Drawing Figures

INJECTION PLOW

This application is a continuation-in-part of application Ser. No. 929,953, filed Aug. 1, 1978, now abandoned.

This invention relates to a fertilizer injection plow, which provides underground fertilization by a fertilizer in liquid or paste form. The plough dispenses the required amount of the fertilizer into the soil at the required depth.

Currently used plows are of heavy construction; they have poor depth stabilization and do not dispense or dose an exactly determined quantity of the fertilizer per unit of area of the soil. They are complicated, and do not assure the complete mixing of liquid or paste fertilizer.

The injection plow of the present invention is of lightweight construction. The depth of its shares is controlled hydraulically. The cylinder which serves the function of storing and mixing the fertilizer acts also as a means for gauging the depth of penetration of the shares into the soil, and of driving the pump which injects the fertilizer into the soil, thereby securing an exact dispensing or dosing of the fertilizer. The illustrative fertilizer injection plow of the invention is adapted for attachment to a ground-traversing vehicle, such as a tractor, as by means of a three-point link attachment means. The angle of attachment of the shares of the injection plow can be readily changed as desired by shortening or lengthening the various links of the three-point attachment.

The invention will be more readily understood upon consideration of the accompanying drawings, in which.

Figure 1:
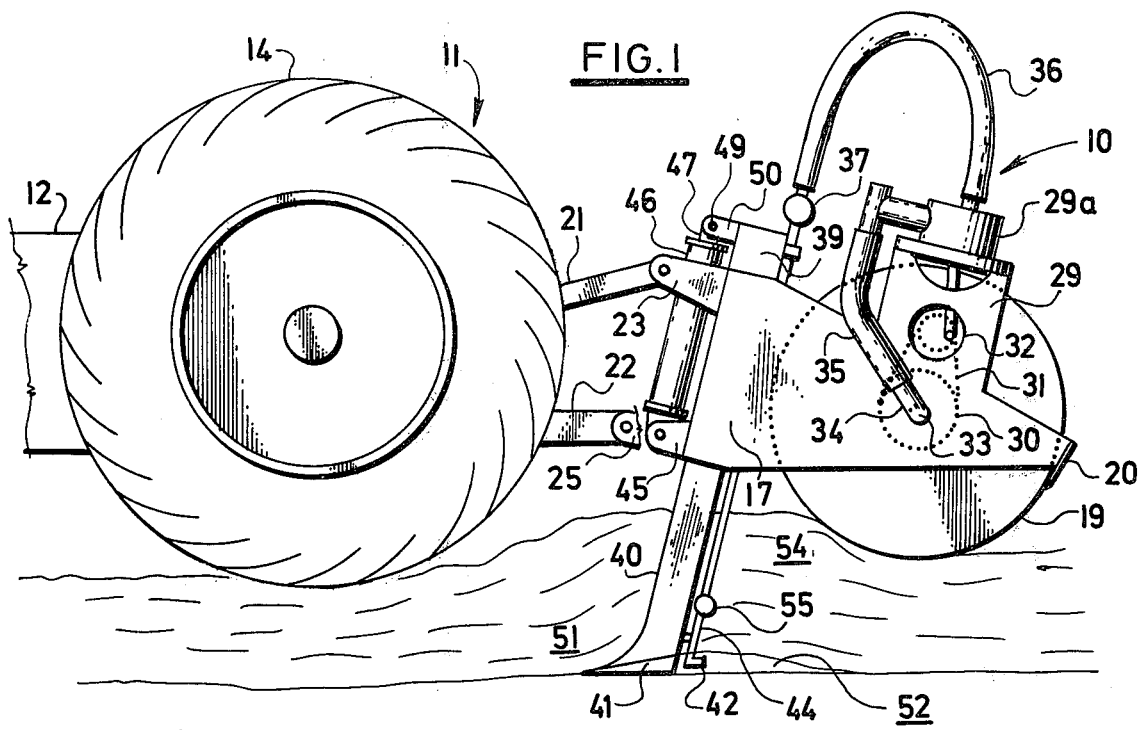
FIG. 1 is a view in side elevation of a preferred embodiment of injection plow in accordance with the invention, the injection plow being shown attached to a fragmentarily shown tractor.
Figure 2:
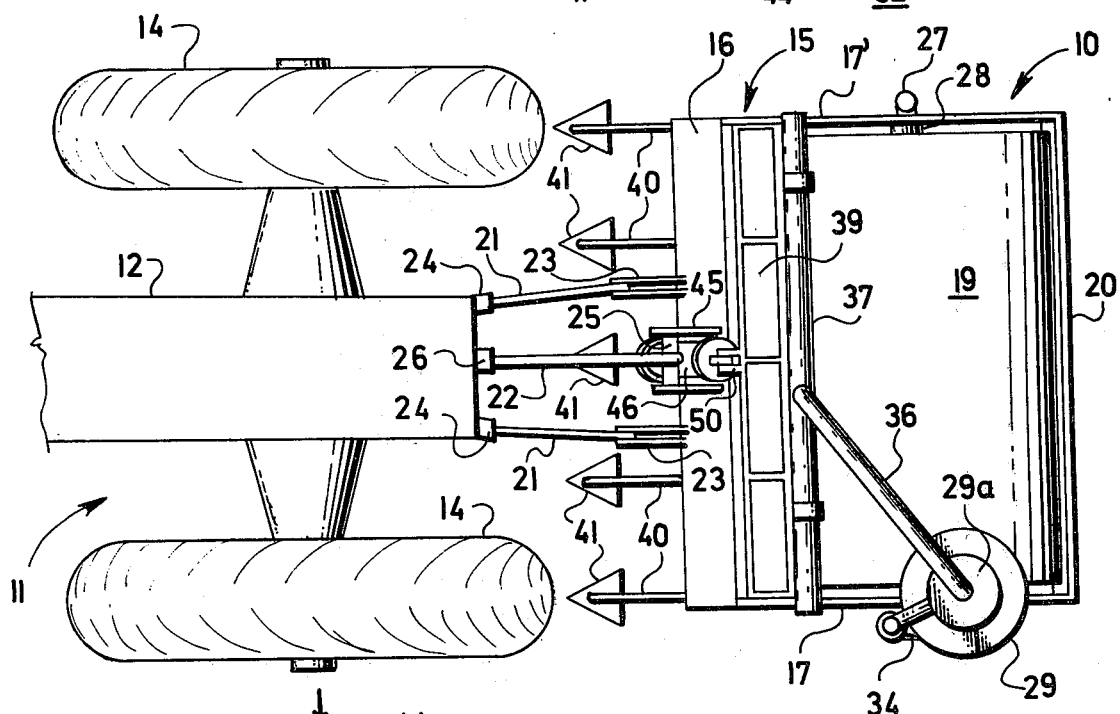
FIG. 2 is a view in plan of the injection plow shown in FIG. 1 and the portion of the tractor shown therein.

Turning now to FIGS. 1 and 2, an injection plow 10 in accordance with the invention is shown attached to the rear end of a fragmentarily shown tractor 11 to be drawn thereby in the direction from right to left in such figures. The tractor has a fragmentarily shown body 12 and driving wheels 14. The injection plow 10 has a frame, generally designated 15, such frame having a transverse front part 16 and two laterally spaced side plate members 17 and 17'.

A circular cylindrical, ground engaging, drum 19 is disposed between and journalled upon the side frame members 17 and 17', the rear ends of said side frame members being joined by a transverse member 20 which functions to scrape away dirt which adheres to the drum. The injection plow 10 is connected to the rear end of the tractor 11 by a 3-point link attachment means. Such means has two similar upper links 21 and a single link 22 disposed symmetrically with respect to the upper links as shown in FIG. 2. Links 21 and 22 may be provided with means (not shown) such as turnbuckles to permit the desired lengthening or shortening of the links to adjust the angle of attack of the shares of the injection plow to be adjusted as desired. The upper links 21 are pivotally connected to the plow 10 and the tractor 11 by clevises and pivot pins, shown at 23 and 24, respectively. The lower link 22 is pivotally connected to the plow 10 and the tractor 11 by clevises and pivot pins shown at 25 and 26, respectively.

A vertical pipe 27 is secured to the frame member 17', such pipe at its lower end being connected to a horizontal pipe extending into the interior of the drum 19 and being sealed with respect thereto by a sealing swivel joint such as shown at the left in FIG. 4 of the U.S. patent of Provine U.S. Pat. No. 544,930. Liquid fertilizer and the like are charged into the drum 19 through the upper end of the filler pipe 27.

The side frame member 17 has a curved housing member 29 attached thereto, member 29 serving to support a pump 29a which may be of any convenient type, such as a piston or wobble-type diaphragm pump. The pump 29a is driven by the drum 19 as it travels over the ground, there being a first sprocket 30 attached to the end of the drum, a sprocket 32 secured to the drive shaft of the pump, and a chain 31 enframed over such two prockets.

The pump 29a is supplied with liquid from the drum 19 by way of a suction pipe similar to that shown at the left in FIG. 4 of the above referred to Provine patent, such suction pipe being connected through a fitting 34 having a fluid-tight swivel joint connection 33 with the drum, such connection being similar to that disclosed by Provine. A pipe or hose 35 extends from the fitting 34 to the intake port of the pump 29a. A pressure delivery pipe or hose 36 extends from the delivery port of the pump 29 to a manifold or cross pipe 37 as shown, a plurality of pipes 44 being connected to the pipe 37, each of the pipes 44 being closely associated with a respective stem or shank 40 of a plow share 41, as shown in FIG. 1.

The injection plow 10 has a vertically adjustable cross member 39 which is guided in the frame between the side frame members 17 and 17'. The upper ends of the various plow stems or shanks 40 are attached to member 39 so that all of the plow shares 41 both vertically with such member 39. Each of the above mentioned pipes 44, which are mounted to the rear of the respective shanks or stems 40 of the plowshares 41, has a rearwardly directed liquid discharge nozzle 42 at its lower end so that liquid from the drum 19 is discharged into the zone 52 (FIG. 1) of the earth wherein the earth has been loosened and displaced by the plowshare 41. Such liquid may be one which fertilizes the earth, one which disinfects the earth, or when which kills the weeds which are growing therein.

The cross member 39, and thus the members 40 and 41 connected thereto, are simultaneously raised and lowered as follows:

A double-acting hydraulic motor having a cylinder 46 is pivotally connected at its lower end by clevis and pivot pin means 45. The motor has a piston with a piston rod which protrudes from the cylinder at its upper end 47. The piston rod is pivotally connected by the pivot pin 49 to a clevis 50 which is secured to the member 39 centrally of the latter. It can thus be seen that by the introduction of fluids such as a liquid into one end of the cylinder 46 and the exhaust of fluid from the other end thereof the members 39, 40 and 41 can be selectively raised and lowered as desired relative to the axis of the drum 19. Such raising and lowering of the plowshares is preferably under the control of the operator of the tractor 19 by suitable operation of conventional control means interposed between a source of hydraulic pressure and the hydraulic cylinder 46.

Figure 3:
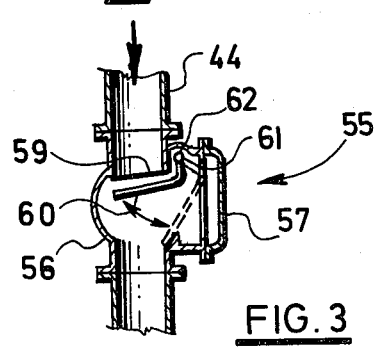
FIG. 3 is a fragmentary view in vertical section of a portion of an injection pipe associated with each share of the injection plow and of the valve interposed in such pipe above the injection nozzle attached thereto.

In the interest of uniformity of operation of the injection plow, each of the pipes 44 leading to the spray nozzles 42 is provided with a spring biased valve 55, each of valves 55 functioning to close off the nozzle 42 from the pipe 44 when the pressure in the pipe falls below a desired pre-determined value, and to open when the pressure of the liquid in pipe 44 exceeds such value. A preferred embodiment of valve 55 is shown in FIG. 3. Such valve has a valve body 56 with a removable cover 57 sealingly attached thereto. The valve body has a valve seat 59 with which a pivotally mounted clapper or valve element 60 cooperates. Clapper 60 is mounted upon a pivot pin 61 about a portion of which there is coiled a torque coil spring 62, one tang of the spring engaging the fixed body 56 of the valve, and the other tank of the spring engaging an outer portion of the clapper 60 spaced from the pivot pin. The spring 62 constantly urges the clapper 60 toward its upper, valve-closed position, but is overcome by the liquid in pipe 44 when the pressure of the liquid exceeds said desired predetermined value.

It will be seen from the above disclosure that the drum 19 has the simultaneous functions of stabilizing the plowshares 41, storing liquid or paste fertilizer or other flowable earth treatment medium, agitates the flowable medium within the drum, drives the injection pump 29a, and acts as a depth gauge or limiting means for the plowshares. The plowshares loosen and irrigate the earth in zone 51 (FIG. 1) the jets of material from nozzles 42 fertilizing, disinfecting, or killing the weeds in the earth. The mound of earth in zone 54 is leveled approximately to its former configuration by the drum 19 as the drum passes thereover.

Although the invention is illustrated and described with reference to one preferred embodiment thereof, it is to be expressly understood that it is in no way limited to the disclosure of such a preferred embodiment, but is capable of numerous modifications within the scope of the appended claims.

I claim:

1. A fertilizer injection plow for underground fertilization by a fluid fertilizer, said plow being adapted for mounting on a ground traversing vehicle, comprising a frame, a ground-engaging fertilizer-storing drum mounted on the frame for rotation by ground contact, a pump mounted on the frame and having an inlet and an outlet port, means drivingly connecting the pump to the drum so that the pump is driven by the drum in synchronism therewith, a first conduit means connecting the inlet port of the pump to the interior of the drum, a plowshare, a liquid injecting nozzle mounted adjacent the plowshare, and a second conduit means connecting the outlet port of the pump to the injecting nozzle, whereby engagement between the drum and the ground determines the depth of penetration of the plowshare into the ground, and means for adjusting the plowshare vertically relative to the drum, whereby the depth of penetration of the plowshare into the ground can be selectively adjusted.

2. Apparatus according to claim 1, wherein the plowshare is mounted on the lower end of a generally vertical shank, and a comprising means mounting the injecting nozzle on the shank behind the plowshare.

3. Apparatus according to claim 1, comprising a cross member mounted on the frame for vertical adjustment by said means for adjusting, and a plurality of plowshares mounted in spaced relation along the length of the cross member.

4. Apparatus according to claim 3, wherein each plowshare has a liquid injecting nozzle associated therewith, each nozzle being connected by conduit means to the outlet part of the pump.

5. A fertilizer injection plow for underground fertilization by a fluid fertilizer, said plow being adapted for mounting on a ground traversing vehicle, comprising a frame, a ground-engaging fertilizer-storing drum mounted on the frame for rotation by ground contact, a pump mounted on the frame and having an inlet and an outlet port, means drivingly connecting the pump to the drum so that the pump is driven by the drum in synchronism therewith, a first conduit means connecting the inlet port of the pump to the interior of the drum, a plowshare, a liquid injecting nozzle mounted adjacent the plowshare, and a second conduit means connecting the outlet port of the pump to the injecting nozzle, whereby engagement between the drum and the ground determines the depth of penetration of the plowshare into the ground, means for adjusting the plowshare vertically relative to the drum, whereby the depth of penetration of the plowshare into the ground can be selectively adjusted, a cross member mounted on the frame for vertical adjustment with respect thereto, a plurality of plowshares mounted in spaced relation along the length of the cross member, each plowshare having a liquid injecting nozzle associated therewith, each nozzle being connected by conduit means to the outlet part of the pump, and a separate pressure relief valve interposed in the conduit means leading to each nozzle, said pressure relief valves all opening when subjected to a predetermined pressure of liquid delivered to them by the pump.

* * * * *